2 Sheets--Sheet I.
A. J. FULLAM.
Devices for Shearing Sheep.
No. 5,701. Reissued Dec. 23, 1873.
Fig. I
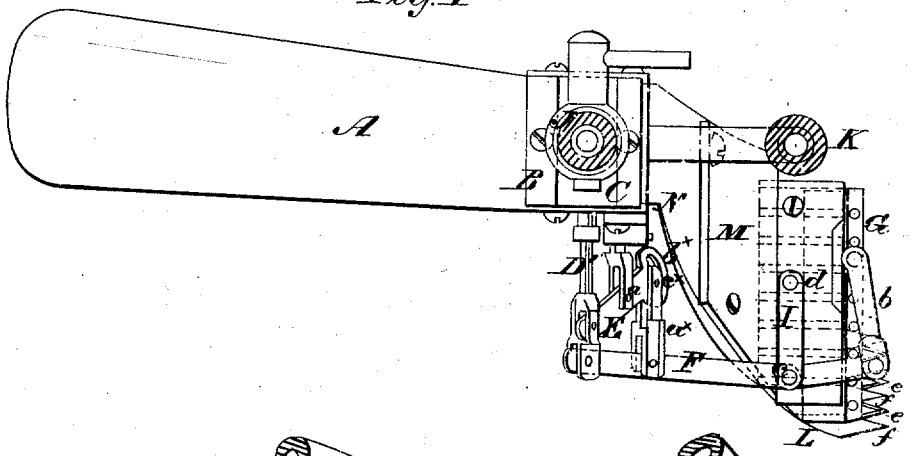
Fig. 2
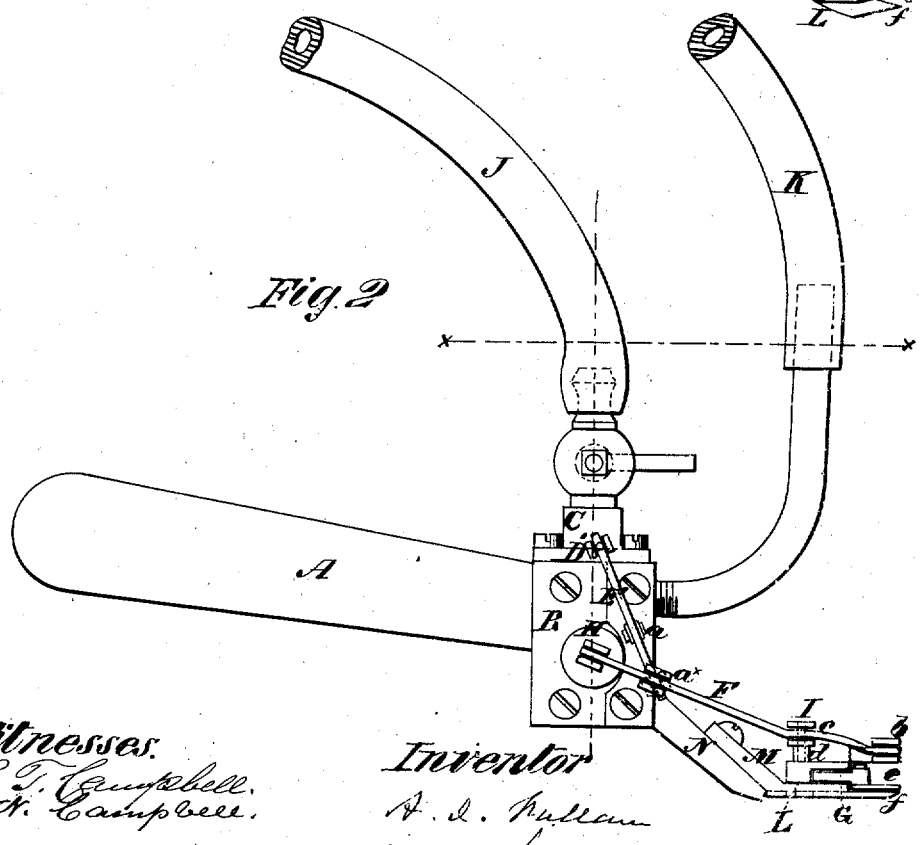
Witnesses.
R. T. Campbell.
J. H. Campbell.
Inventor
A. J. Fullam
by
Marsh, Fenwick & Lawrence 2 Sheets--Sheet 2.
A. J. FULLAM.
Devices for Shearing Sheep.
No. 5,701. Reissued Dec. 23, 1873.
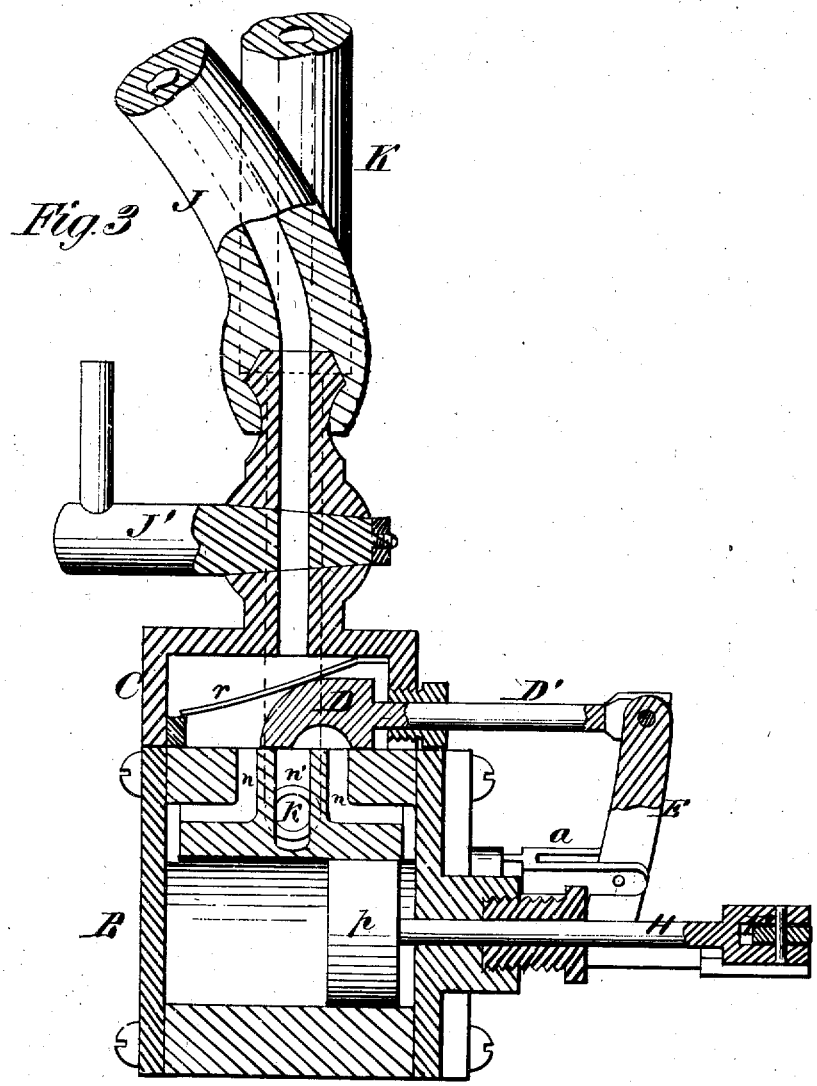
Witnesses.
R. T. Campbell.
J. N. Campbell.
Inventor
A. J. Fullam
by
Munn, Fenwick & Lawrence

UNITED STATES PATENT OFFICE.

ADONIRAM J. FULLAM, OF SPRINGFIELD, VERMONT, ASSIGNOR TO WILLIAM EARL, JR., JOHN G. BLUNT, ROSWELL T. SMITH, AND JOSEPH K. PRIEST.

IMPROVEMENT IN DEVICES FOR SHEARING SHEEP.

Specification forming part of Letters Patent No. 42,572, dated May 3, 1864; reissue No. 5,701, dated December 23, 1873; application filed June 24, 1873.

*To all whom it may concern:*

Be it known that I, ADONIRAM J. FULLAM, of Springfield, in the county of Windsor and State of Vermont, have invented a new and Improved Device for Shearing; and I do hereby declare that the following is a full, clear, and exact description thereof, reference being had to the accompanying drawings making part of this specification, in which—

Figure 1, Plate 1, is a top view of the device and a section (indicated by dotted line *x x*, Fig. 2) through flexible pipes thereof. Fig. 2, Plate 1, is a side view of the device. Fig. 3, Plate 2, is a section taken vertically and transversely through the engine of the device, exposing the interior of the same.

Similar letters of reference indicate corresponding parts in the several figures.

The object of my invention is, first, to actuate the cutters of a portable device which is designed for shearing wool or hair, and which is guided and controlled by the hand of an operator, by means of steam or other equivalent elastic agent, introduced into an engine which is mounted upon the support which carries the handle and cutters of the device; second, to provide for conveying the power to the said device through a flexible pipe or hose which will allow all the required manipulations of the instrument while in operation, as will be hereinafter set forth.

The following description of my invention will enable others skilled in the art to understand it.

In the accompanying drawings, A represents the handle of the device, which may be made of metal or other suitable material, and which is of such size that it may be conveniently grasped by the hand of the operator. On one end of this handle A is a block, B, in which a steam-chamber is formed, containing a piston, *p*, the rod H of which extends out and is pivoted to the long arm of a lever, F. On top of the block B, and secured thereon, is a steam-chest, C, in which works a slide-valve, D, that is held down on its seat by a spring, *r*. The ports *n n* admit steam into the piston-chamber at opposite ends thereof, and the port *n'* allows spent steam to exhaust from the piston-chamber and valve-chest. The rod D' of the slide-valve D extends out through the valve-chest, and is pivoted to a lever, E, which lever has its fulcrum at *a*, and is connected to the lever E by means of a link, $a^{\times}$. The lever E has a curved slot, $b^{\times}$, through one end, through which slot a pin, $c^{\times}$, in the link $a^{\times}$ passes, as shown in Fig. 1. The slide-valve is by these means properly operated by the movements of the piston, actuated by steam, which is conducted into the valve-chest through a pipe, J, and is allowed to act alternately on opposite sides of the piston, and to exhaust through a pipe, K.

It will be seen that the above-described parts constitute a portable engine on one end of a handle, A, which engine does not differ in its construction from the well-known high-pressure reciprocating engines.

This engine furnishes the motive power for actuating a cutter-bar, G. This cutter-bar is provided with a number of tapered or V-shaped cutters, *e*, like the cutters of a harvesting-machine, which work over fixed cutters *f* of a similar form, and these fixed cutters or cutting-teeth are secured to a plate, L, on the front end of an inclined plate, M. The plate M is bolted on the inclined extension N at the lower end of the front part of the block B. By this arrangement the cutters are some distance below the handle A, and abundant space is allowed for the operator to grasp this handle and conveniently manipulate the device while shearing an animal.

The pipe J, which leads to a generator of steam or other suitable elastic agent, is flexible, and may be of india-rubber or other suitably-flexible material, which, while it serves as a conduit for the elastic agent, will allow the cutting device to be conveniently moved over an animal in every direction and without restraint. The exhaust-pipe K is also flexible.

The lever F, above referred to, has its fulcrum *c* at the outer end of a bar, I, which bar is fitted loosely on a post, *d*, that rises perpendicularly from the plate L. The shortest arm of the lever E is connected, by a pitman or link, *b*, to the cutter-bar G. I thus communicate a reciprocating motion to the cutter-bar.

It will be seen from the above description that I combine with portable shears an engine for operating them and a flexible connection between the shears and engine and the generator of the power required, the shears and engine being portable together.

If steam be the agent employed for operating the shears, it may be generated in a small boiler and alcohol or coal-oil used as the fuel, the boiler being located at any convenient point remote from the operator.

Having described my invention, what I claim as new, and desire to secure by Letters Patent, is—

The shearing implement consisting of the handle and comb-plate extending from its end, the engine supported by said handle, and a moving shearing-cutter, arranged to operate with the comb-plate, and operated by said engine through power supplied from a reservoir situated at any desired point, substantially as described.

Witness my hand and seal in the matter of my application for reissue of my Letters Patent No. 42,572, dated May 3, 1864.

ADONIRAM J. FULLAM. [L. S.]

Witnesses:

V. S. FULHAM,

FREDK. E. RUSSELL.